INVENTORS
EUVAL S. BARREKETTE
ERIC DONATH
HAROLD H. HERD

BY Alvin J. Riddles
ATTORNEY

United States Patent Office 3,423,740
Patented Jan. 21, 1969

3,423,740
INFORMATION HANDLING DEVICE

Euval S. Barrekette and Eric Donath, New York, N.Y., and Harold H. Herd, Pacific Grove, Calif., assignors to International Business Machines Corporation, New York, N.Y., a corporation of New York
Continuation of application Ser. No. 195,859, May 18, 1962. This application June 30, 1965, Ser. No. 480,237
U.S. Cl. 340—174 17 Claims
Int. Cl. G11b 5/00

ABSTRACT OF THE DISCLOSURE

An information handling device is provided by the formation of an information element of material in discrete areas on a substrate by the selective application of heat to discrete portions of a gaseous component of a temperature sensitive reversible reaction, wherein the reaction proceeds in one direction at one temperature and in the opposite direction at another temperature. The presence of the material and the physical properties thereof convey logical information in information channels. For example, metal can be deposited from gaseous metal compounds in the presence of heat at discrete areas on a substrate, the reaction being reversible. The deposited metal has physical properties e.g., optical and magnetic, which can be used to convey information to information handling means.

This invention is a continuation of copending application Ser. No. 195,859, now abandoned.

This invention relates to information handling devices and, in particular, to a reversible information storage and switching arrangement useful in information processing.

As the art of information handling has developed, machines have been constructed in such a manner that each discrete increment of information has been retained in an individual memory element. The presence or absence of the information in the individual elements and the combinatorial relationship of the information increments has been processed by inter-related sensing and switching channels which deliver resulting information based on the information state of the individual elements. In systems of the type employed thus far in the art, only the information state of the individual element has been available for its logical properties in the sensing and switching channels and the signals generated and processed are usually confined to a single medium. It has become apparent in the art that logical information processing benefit can be derived by flexibility in being able to sense not only the information state, but also the presence or absence of the individual memory element and in being able to convert in processing the information from one signal medium to another.

What has been discovered is an information storage and switching arrangement wherein the presence of an individual information memory element occurs as a result of a chemical reaction and the logical properties of the presence of the memory element together with particular physical property states of the material of the memory element are available for storage and logical information processing operations in more than one signal medium. Specifically, the invention involves the formation of individual memory locations by a temperature governed chemical reaction which operates to produce discrete bodies of materials having at least one or more physical properties that are useful in other signal media; such as, for example, optical or magnetic signal media.

In one embodiment of the invention, the discrete memory location is a nickel film produced by a small area heat application to a substrate in contact with a nickel carbonyl gas. The resulting film has optical, magneto-optical and magnetic properties. A very high density of film spots is possible. Such an arrangement has logical properties in the presence or absence of the film as well as the physical property state thereof and will convert information from one signal medium to another. The combined logical properties of the presence or absence of the film coupled with its physical state is particularly valuable in achieving non-commutative logical functions.

It is an object of this invention to provide an information processing arrangement having greater logical properties and greater signal media flexibility.

It is another object of this invention to provide a reversible information processing arrangement capable of delivering an output in response to signal conditions of different logical weight.

It is another object of this invention to provide an information processing arrangement that will transform information from one signal medium into another.

It is another object of this invention to provide an information processing arrangement capable of handling information in a plurality of signal media.

It is another object of this invention to provide a large capacity, high speed, fast random access memory.

It is another object of this invention to provide a high density, non-destructive readout, optical, chemical, reversible memory.

It is another object of this invention to provide an optical, magnetic, chemical, reversible memory.

The foregoing and other objects, features and advantages of the invention will be apparent from the following more particular description of preferred embodiments of the invention, as illustrated in the accompany drawings.

Figure 1:
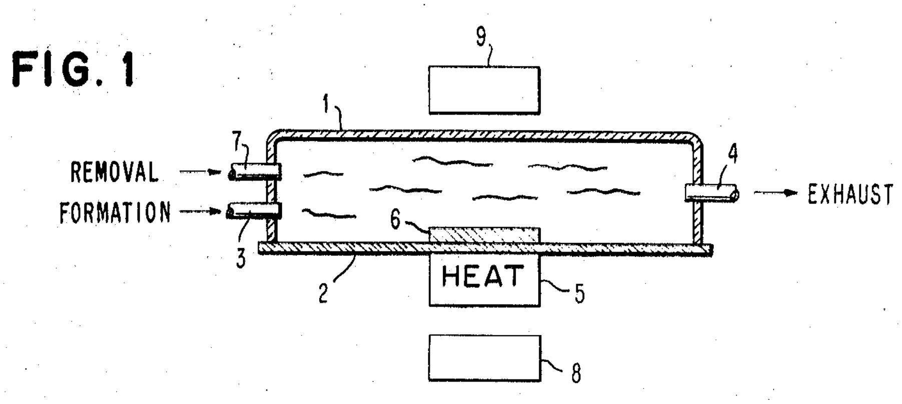
FIG. 1 is a schematic view of the invention illustrating the memory location formation, removal and sensing features.

The features and advantages of the invention are achieved through the formation of an information element of material in discrete areas on a substrate by the selective application of heat to discrete portions of the gaseous component of a temperature sensitive, reversible reaction, wherein the reaction proceeds in one direction at one temperature and in the opposite direction at a different temperature and then employing the presence of the material and the physical properties of the material to convey logical information in information channels.

The information element, in accordance with the invention, is formed by applying heat to a selected area of a substrate to which is exposed a gaseous component of a temperature sensitive, reversible reaction.

There are a class of chemical reactions which are reversible, which have a gaseous component in one state and a non-gaseous product in the other state and which can be reversed by the selective application of heat. Two well-known examples of this class of reactions are the carbonyl reactions; such as, for instance, the nickel carbonyl and iron carbonyl reactions known in the gas plating art, where, for instance, a nickel carbonyl or iron carbonyl gas, when exposed to heat, will deposit nickel or iron; and, the group IV element-halogen class of reactions known in the semiconductor art. In this type of reaction the group IV element-halogen compound, when exposed to heat, will deposit the group IV element.

The carbonyl reaction may be described as follows:

*Equation 1*

$$W + 4(CO) \overset{\text{Temp.}}{\rightleftarrows} W(CO)_4.$$

where:

W is, for example, nickel or iron, as discussed.

This reaction may be reversed by temperature reduction and accelerated by exposure to carbon monoxide. The atmosphere may then be purified by passing it through an ice bath. The art of the efficient use of the nickel carbonyl reaction is well-known in the gas plating industry.

The group IV halogen reaction is a reaction of a group IV element with a halogen; for example, germanium or silicon and iodine, which, on the selective application of heat deposits the group IV element. These reactions respond to both increases and decreases in temperature and can be reversed by selective temperature application. An example of the increased temperature sensitive reaction involving silicon and iodine is represented by:

*Equation 2*

$$SiI_2 \overset{\text{Heat}}{\rightleftarrows} Si\downarrow + I_2.$$

This reaction is known in the art as the Van Arkel reaction.

An example of a decreased temperature sensitive reaction involving germanium and iodine is represented by:

*Equation 3*

$$2GeI_2 \overset{\text{Heat}}{\leftrightarrows} Ge\downarrow + GeI_4.$$

Each of these chemical reactions is illustrative of a class wherein the chemical reaction is reversible in response to the application of temperature, there is a gaseous component present in one state and a non-gaseous component present in another state and, in accordance with the invention, is usable to provide the existence of a logical element which has logical properties in another signal medium.

In connection with FIG. 1, there is illustrated a schematic view indicating the general features involved in the invention.

Referring now to FIG. 1, a container 1 is illustrated equipped with an element supporting substrate 2 and provided with a logical element formation opening 3 and an exhaust opening 4 so disposed that a gaseous phase of a temperature sensitive chemical reaction may enter the opening 3 and pass over the substrate 2 before leaving through the exhaust 4. A source of selectively applied heat 5 is positioned where it can be effective on a restricted area of the substrate 2. The formed information element 6 is the non-gaseous component of the reaction after heat application. The non-gaseous component may be in any physical form, liquid or solid, as long as physical properties are present that are useful in the signal medium to be employed. The information element 6 may be selectively removed by introducing proper thermal conditions and may be accelerated by providing a desirable ambient by a separate removal means 7.

The information present in the element 6 is then processed in information channels, one of which is schematically shown as elements 8 and 9. The container 1 and substrate 2 may be of any material capable of providing a non-contaminating reaction containing enclosure that is compatible with the signal medium in which the information element 6 is to be effective; and, hence, the container 1 and the substrate 2 may be equipped with particular properties useful in the particular signal medium involved.

For example, the substrate or container may have light polarizing properties or contain wires, as will be later described.

In accordance with the invention, in the actual formation of the information element 6, a gaseous phase of a temperature controlled reaction that has a non-gaseous component in one reaction stage is introduced into the container through the formation opening 3 and caused to pass over the substrate 2 and exhaust through the opening 4. The heat necessary to drive the reaction is locally applied to the gas, usually through the substrate at the discrete point or points where the information element or elements are desired through schematic element 5 which provides a temperature change in a discrete area of the substrate 2. This operates to drive the chemical reaction at that point to cause the gaseous phase to deposit a quantity of non-gaseous material on the substrate. The deposited non-gaseous material then serves as the information element 6 in FIG. 1. The schematic element 5 may, for example, be any localized heat source such as a focused light beam, an electron beam, a laser beam, or a heat radiating or absorbing junction in the substrate 2.

The non-gaseous material then serves as an individual information element 6 and depending upon the physical properties of the deposited element 6, the information can be processed in at least one other information channel involving at least one other signal medium through elements 8 and 9, of which element 8 may, for example, be a source of light or electricity, and schematic element 9 may, for example, be a photocell or an electrical sense winding.

The individual deposited elements have valuable memory properties. Since electron beams and laser light beams can be focused to within less than a 0.001 inch diameter spot, densities of the order of one million elements per square inch are achievable. Further, since the memory elements can selectively be changed and erased individually; a large capacity, high speed, fast random access memory is achieved which can be altered independently of all of the information stored in the memory.

The deposited element is usable for both its presence, absence, and for its particular physical properties. Where the information element 6 is deposited from a nickel carbonyl gas, in accordance with Equation 1; and, hence, is a film of nickel, in addition to having optical properties in being opaque to the transmission of light, it has magnetic properties in the form of a rectangular hysteresis loop, and, it also has magneto-optical properties in rotating the plane of polarized light, in accordance with the Faraday effect, well-known in the art. Where the information element 6 is of germanium or silicon, as described in connection with Equations 2 and 3, physical properties peculiar to the particular element deposited will be available for information processing purposes.

It will then be apparent that one feature of the invention lies in the information processing flexibility that is realized through formation of information elements in one signal medium that have logical properties in other signal media by virtue of the physical properties of the element deposited. In the light of the above teaching, one skilled in the art can readily select an appropriate temperature controlled reversible reaction having a gaseous phase in one state that will deposit a non-gaseous element having the requisite physical properties.

In accordance with the invention, the information element 6 may be removed by the selective application of heat and the reaction accelerated by the providing of an ambient in contact with the element 6 so that the element 6 is returned to the gaseous form, which is then exhausted through the opening 4. A removal means for the accelerating ambient is shown schematically as a separate element 7, although it will be apparent to one skilled in the art that through suitable valve equipment the opening 3 could be employed.

With respect to the nickel carbonyl reaction, in accordance with Equation 1, the element 6 may be removed by the application of heat at 80° C., accompanied by the introduction through the removal means 7 of carbon monoxide gas. In the case of the group IV halogen reactions, as indicated in Equation 2 involving the pyrolytic decomposition of a silicon halogen gas, the introduction of iodine through the removal means 7, will, in the presence of sufficient heat, form silicon-iodide, which is then removed through the exhaust opening 4. In the case of Equation 3, involving the pyrolytic disproportionation reaction of germanium and a halogen, with this reaction, since the formation of the element 6 involved making the localized region of the substrate the coolest point in the system, then it will be apparent to one skilled in the art that the selective application of heat to the region of the element 6, rather than to the entire region, will result in the formation of germanium-di-iodide ($GeI_2$) from the germanium forming the element 6. This may be accelerated by introducing, for example, an ambient of germanium-tetra-iodide ($GeI_4$) into the removal opening 7, and applying heat at element 5 so that the material of element 6 enters the gaseous component of the reaction and is exhausted out the opening 4.

One of the major advantages of the invention lies in the fact that logical properties are present which may be sensed in a plurality of signal media. In other words, the information may be chemically stored and it may, for example, have its presence manifested optically, magnetically and/or magneto-optically.

In each of the applications of the device, the presence or absence of the information element 6 is available as one logical variable and physical properties or the conditions of the material 6 are available as other logical variables. The logical properties of such an arrangement, where there is a dominant variable; namely, the presence or absence of the information element 6, and at least one other variable; namely, the magnetic or optical state of the material, of which the information element 6 is formed, is particularly adaptable to information processing involving logical operators that are dependent upon the presence or absence of a particular variable and not merely the number of variables present or absent. This logical property is known in the art as non-commutativity. The logical property of non-commutativity, in essence, permits the achievement of large numbers of logical operators in an information system involving a given number of variables. The property of non-commutativity is discussed in U.S. Patent 3,028,088 along with a discussion of the value of such logical operators.

For purposes of illustration, let there be considered a condition involving purely binary signal levels wherein the presence of the information element 6 in FIG. 1 will be assigned the logical variable designation *p* and the absence of the information element 6 will consequently be not *p*, symbolized $\bar{p}$. Since the logical element will have various physical properties useful for logical purposes, let it also be assumed that the presence or absence of the dominating variable *p* will be conditioned by a second variable using light as the signal medium to which may be assigned the value of *q* when on and $\bar{q}$ when off.

There are two non-commutative logical operators involving two variables where one variable is dominant. The first of these indicated is known logically as IF THEN and is symbolized ⊃. This logical operator indicates the absence of an output dependent upon the presence of one variable and the absence of the of the other. This is sometimes described logically as "if *p* then *q*." The second of these logical operators is the denial of the first and is symbolized ⊅, and is referred to as NOT IF THEN. This logical operator indicates the presence of the dominant variable and the absence of the second.

The following truth table is set forth to illustrate some of the applications of the device:

TABLE I

| p | q | pq ⊃ | pq ⊅ |
|---|---|---|---|
| 1 | 1 | 1 | 0 |
| 0 | 1 | 1 | 0 |
| 1 | 0 | 0 | 1 |
| 0 | 0 | 1 | 0 |

It will be apparent, in accordance with the invention, that where a physical property of the element is available, for example, the magnetic state of the deposited material in the case of a nickel film and this state is employed, either magnetically or optically, a third logical variable will become available. As larger numbers of variables are involved in the system, the element of non-commutativity acquires a great deal more significance and the number of non-commutative operators in the system rapidly exceeds the number of commutative operators so that the quantity of logical information processing available with this type of operator becomes much greater due to this increased flexibility. As an illustration of a three-variable non-commutative operator that is achievable, let there be considered the fact that the presence or absence of the information element 6 may be assigned *p* or $\bar{p}$, as above described. Let it be further assumed that the information element 6 has both magnetic and magneto-optical physical properties. The magnetic state of the element 6 may be assigned as *q* or $\bar{q}$, again, as above described, and the presence or absence of polarized light through the magnetic element may be assigned the variable *r* or $\bar{r}$. Under these circumstances as shown in Table II, following, where the information element 6 is present the material of 6 is in one magnetic state and the polarized light is on, an output will be received. Since all conditions must be satisfied, the logical operator A in Table II is, in reality, a three-way AND function. For purposes of description, the logical operator is identified by a letter corresponding to a line in the truth table in which a "1" appears.

Let there next be considered as a second condition the presence or absence of the information element 6 as the variable *p*, one physical property, for example, the magnetic state of the material of the information element 6 as the variable *q* and a second physical property of the material of the information element 6, for example, its rotation of polarized light, as the variable *r* and that an output is received when *q* is zero and *r* is one. Under these circumstances, the dominant variable *p* must be present, the polarized light *r* must be rotated and passed and an output is received under the combination of these two conditions only when the magnetic state *q* of the material of the information element 6 is zero, in other words, *q*. Under these circumstances, the logical operator C is provided and indicated at Table II.

TABLE II

| | p | q | r | A | C |
|---|---|---|---|---|---|
| A | 1 | 1 | 1 | 1 | 0 |
| B | 1 | 1 | 1 | 0 | 0 |
| C | 1 | 0 | 1 | 0 | 1 |
| D | 0 | 0 | 1 | 0 | 0 |
| E | 1 | 1 | 0 | 0 | 0 |
| F | 0 | 1 | 0 | 0 | 0 |
| G | 1 | 0 | 0 | 0 | 0 |
| H | 0 | 1 | 0 | 0 | 0 |

The above discussion is provided to illustrate the logical properties present in the invention although in the light of the teaching present many such logical operators will occur to one skilled in the art.

Figure 2:
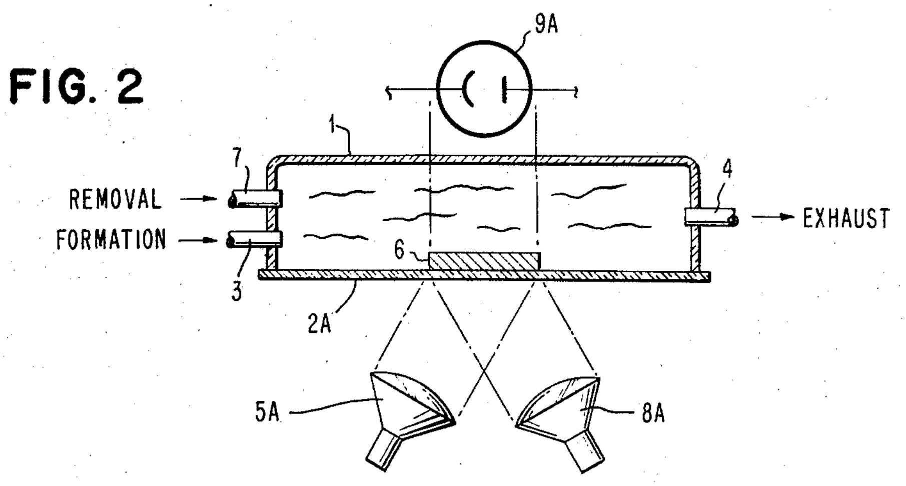
FIG. 2 is a view of the invention illustrating the use of certain optical properties.

Referring next to FIG. 2, a view is provided illustrating a hardware realization of some of the optical properties of the invention wherein the location selection heat element is illustrated as a light 5A, the substrate and the container 1 are translucent and the presence or absence of the information element 6 is interrogated through a source of light 8A, which is sensed by a photocell 9A. Under the conditions shown in FIG. 2, an information element 6 produced by an appropriate chemical reaction, as illustrated by any of Equations 1, 2, or 3, would permit the logical functions described in connection with Table I to apply. To source of heat 5A may be focused to a very fine density through the use of an electron beam, by optical techniques and through the use of a coherent light source for the element 5A, such as a laser as shown in U.S. Patent 2,929,922.

As shown in FIG. 2 and illustrated in Table I, binary information is processed by the translucence or opaqueness of the information element 6 with respect to the light from element 8A.

Figure 3:
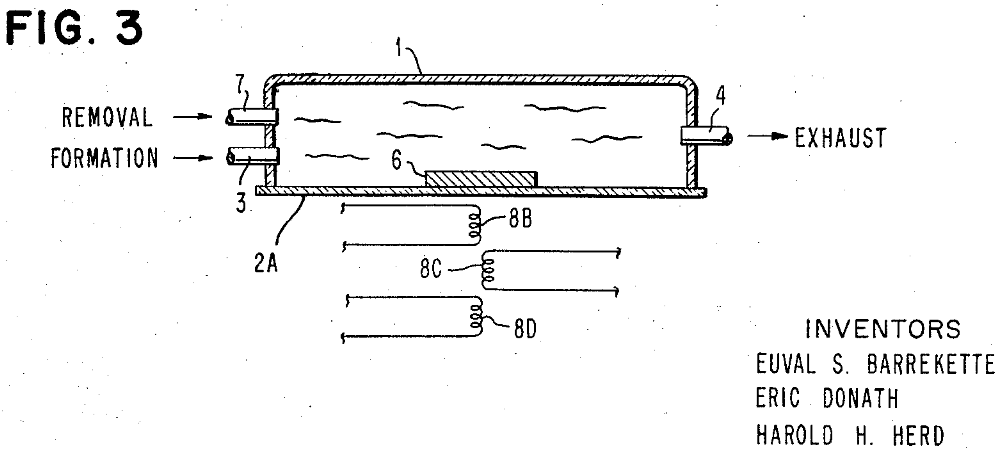
FIG. 3 is an illustration of the invention illustrating the magnetic properties.

Referring next to FIG. 3, an illustration is provided of the magnetic properties of the device. In FIG. 3, read, write and sense windings 8B, 8C and 8D, respectively, are provided in magnetic coupling relationship to the element 6. Under these circumstances through the write winding 8C, the element 6 may be set to one of two states in accordance with its essentially rectangular hysteresis loop.

Figure 4:
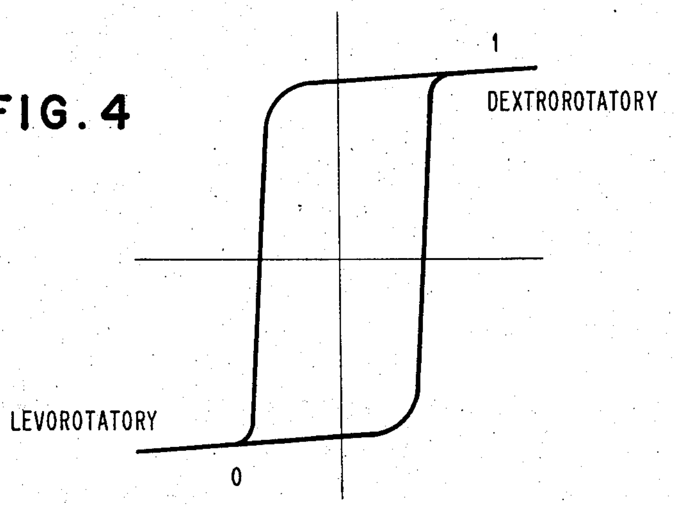
FIG. 4 is a rectangular hysteresis curve illustrating states of magnetic materials and optical polarization effects.

Referring next to FIG. 4, a schematic view of a rectangular hysteresis loop is shown with the binary 1 at one extreme of the loop and the binary 0 labelled at the other end. The light polarization properties are labelled at the corresponding portion of the loop.

Referring to both FIGS. 3 and 4, an electrical current pulse on the winding 8C will set the element 6 to the magnetic state 1 of FIG. 4. In this state 1, a pulse signal on the winding 8B will cause the material of element 6 to assume the 0 state of its hysteresis loop, resulting in the generation of a signal pulse in sense winding 8D.

Figure 5:
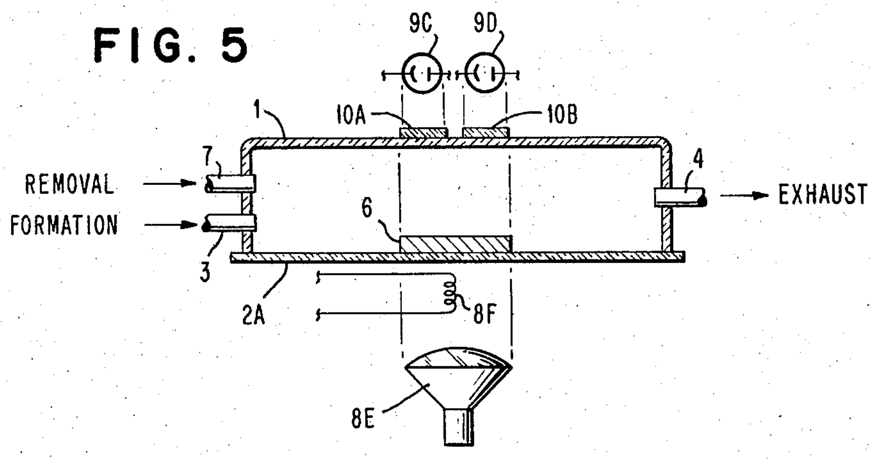
FIG. 5 is an illustration of the invention illustrating the magneto-optical properties.

It will be apparent to one skilled in the art that the views of the figures are in an extremely rudimentary form illustrating only the factors of the features of the invention involved and that in the light of the teaching provided, one skilled in the art can readily extend the principles to the existing magnetic memory systems available in the art.

Where the material of the information element 6 involves further rectangular hysteresis properties, as illustrated in FIG. 4, as a result of the Faraday effect, a beam of polarized light will be rotated, in accordance with the magnetic state of the material of the information element 6. The use of this property is schematically illustrated in connection with FIG. 5. In this figure, the information element 6 is capable of two stable magnetic states, as illustrated in FIG. 4, and optically each magnetic state has associated therewith a direction of rotation of a polarized light beam. These polarization directions are labelled dextrorotatory and levorotatory. In FIG. 5 the presence of the information element 6 is provided by formation, as above described. A source of polarized light 8E is then directed through the information element 6 at two optical polarization elements 10A and 10B; for example, such as polaroids, Nicol prisms or Kerr cells, so arranged that their planes of polarized light are perpendicular to each other and in part of the path of the light from element 8E. The magnetic state of the information element 6 is set, in accordance with the power supplied to a winding 8F so that when an electrical signal on the winding 8F operates to set the element 6 in the magnetic state indicated by 1, in FIG. 4, in this state the polarized light 8E is rotated in a dextrorotatory direction so as to be perpendicular with the light polarization plane of element 10B. This combination is then opaque to transmission of the polarized light and no signal is received by the photocell 9D. At the same time, the polarized light, rotated by the magnetic state of information element 6, coincides with the plane of polarization of the element 10A resulting in a signal at photocell 9C.

Similarly, when the electrical signal applied at 8F operates to set the magnetic state of the information element 6 at the 0 condition, as indicated in FIG. 4, a polarized light signal is received at photocell 9D and not received at 9C. It will be apparent then that the arrangement of FIG. 5 not only provides non-commutative logical operators involving three independent variables in different signal media but it also generates the denial or inversion of the logical operator simultaneously with the operator itself.

It will be apparent to one skilled in the art, in the light of the above teaching, that a wide range of changes in structure may be made in utilizing the principles of the invention. For example, magnetic read, write and sense conductors may be incorporated into the container and substrate. Similarly, light sources, polarization and other optical properties may be made a part of the container itself.

What has been described is a memory and/or logical arrangement whereby the presence or absence of a discrete logical information element may be provided in a chemical medium subject to a thermal control and the physical properties of the logical information element so provided may be employed in at least one other signal medium in the processing of information. With the arrangement of the invention, a large capacity, high speed, fast random access memory is achieved, each storage element of which has logical properties in several signal media.

While the invention has been particularly shown and described with reference to preferred embodiments thereof, it will be understood by those skilled in the art that the foregoing and other changes in form and details may be made therein without departing from the spirit and scope of the invention.

What is claimed is:

1. An information processing apparatus utilizing chemical reactants capable of existing in a gaseous state and a non-gaseous state and adapted to change state reversibly in a chemical reaction comprising:
- a substrate;
- means for forming the non-gaseous state of said reactants on said substrate;
- means for reversing said chemical reaction to change said non-gaseous state to a gaseous state; and
- means for detecting the state of said reactants.

2. An information processing apparatus utilizing chemical reactants capable of existing in a gaseous state and a non-gaseous state and adapted to change state reversibly in a chemical reaction comprising:
- a chemical reaction container;
- means for introducing the gaseous state of said reactants into said container;
- means for depositing the non-gaseous state of said reactants at a discrete position of said container;
- means for reversing said chemical reaction to change said non-gaseous state to a gaseous state; and
- means for detecting the presence of said non-gaseous state at said discrete position of the container.

3. Apparatus of the type described in claim 2 including means for exhausting the gaseous state of said reactants from said container.

4. Apparatus of the type described in claim 2 wherein said depositing means includes means for applying heat to said discrete position of the container.

5. Apparatus of the type described in claim 2 wherein said reversing means includes means for introducing an additional chemical reactant into said container.

6. Apparatus of the type described in claim 2 wherein said non-gaseous state is a film of nickel.

7. Apparatus of the type described in claim 2 wherein said non-gaseous state is silicon.

8. Apparatus of the type described in claim 2 wherein said non-gaseous state is germanium.

9. Apparatus of the type described in claim 2 wherein said reversible chemical reaction is of the carbonyl class of reactions.

10. Apparatus of the type described in claim 2 wherein said reversible chemical reaction is of the group IV-halogen class of reactions.

11. Information processing apparatus comprising:
- a substrate;
- means for providing a dominant logical variable in the form of the presence or absence of a non-gaseous nickel reactant utilized in a controllable reversible chemical reaction at a discrete portion of said substrate, the non-gaseous nickel having a magnetic state; and, means for providing at least a one further logical variable, said means including means for altering the condition of said physical property.

12. Apparatus as described in claim 11 wherein said non-gaseous state is nickel and a physical property is the rotation of polarized light by said nickel.

13. An information processing apparatus utilizing chemical reactants capable of existing in a gaseous state and a non-gaseous state and adapted to change state reversibly in a chemical reaction, the non-gaseous state of the chemical reactants having at least one physical property, comprising:

a substrate;

means for forming the non-gaseous state of said chemical reactants on said substrate;

means for reversing said chemical reaction to change said non-gaseous state to a gaseous state;

means for altering a physical property of said non-gaseous state; and means for detecting the presence of said non-gaseous state and the condition of its physical property.

14. An information processing apparatus utilizing chemical reactants capable of existing in a gaseous state and a non-gaseous state and adapted to change state reversibly in a chemical reaction, the non-gaseous state of the chemical reactants having at least one physical property, comprising:

means for introducing the gaseous state of said chemical reactants into said container;

means for depositing the non-gaseous state of said reactants at a discrete position of said container;

means for reversing said chemical reaction to change said non-gaseous state to a gaseous state;

means for altering the condition of a physical property of said non-gaseous state;

means for detecting the presence of said non-gaseous state; and means for detecting the condition of said physical property.

15. Apparatus of the type described in claim 14 wherein the means for detecting the presence of said non-gaseous state includes a source of light.

16. Apparatus of the type described in claim 14 wherein the means for detecting the condition of said physical property involves magnetic coupling.

17. Apparatus of the type described in claim 14 wherein said means for detecting the condition of said physical property involves the magneto-optical rotation of polarized light.

References Cited

UNITED STATES PATENTS 2,847,330 8/1958 Toulmin ------------ 117—212

TERRELL W. FEARS, *Primary Examiner.*

U.S. Cl. X.R.

340—173, 174.1